No. 874,791.
PATENTED DEC. 24, 1907.
R. R. PENN.
LATHE DOG.
APPLICATION FILED MAR. 26, 1907.
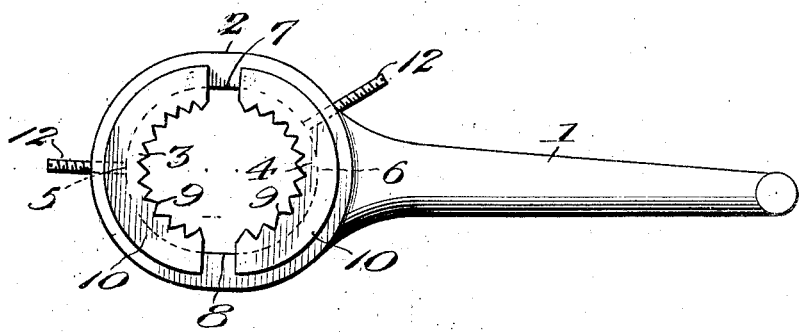
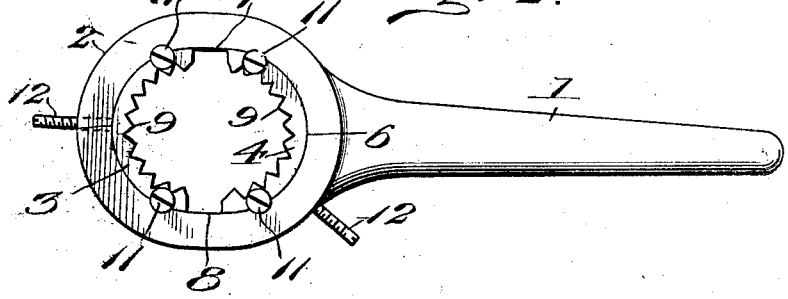
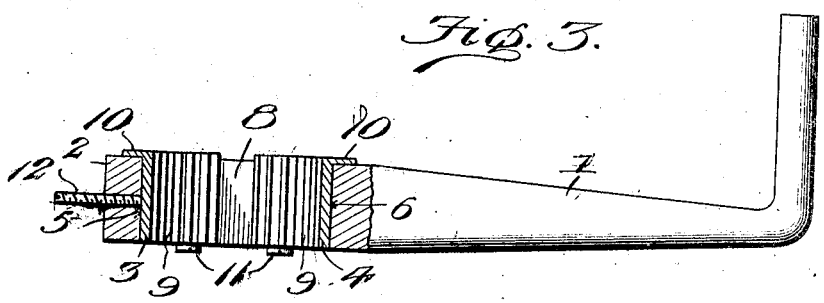
Inventor
Ross R. Penn,
Witnesses
By Victor J. Evans
Attorney

UNITED STATES PATENT OFFICE.

ROSS R. PENN, OF FLORA, INDIANA.

LATHE-DOG.

No. 874,791.　　　　Specification of Letters Patent.　　　Patented Dec. 24, 1907.

Application filed March 26, 1907. Serial No. 364,743.

*To all whom it may concern:*

Be it known that I, Ross R. PENN, a citizen of the United States, residing at Flora, in the county of Carroll and State of Indiana, have invented new and useful Improvements in Lathe-Dogs, of which the following is a specification.

This invention relates to improvements in lathe dogs, wrenches and similar tools of the type provided with jaws to grip the work or object to be held or turned.

The object of the invention is to provide a simple and effective device of this character in which the jaws are self-adjusting in either direction of movement of the tool to grip objects varying to a greater or less degree in size and to regulate their grip according to the amount of resistance of the object to be held or turned.

A further object is to provide jaws which are readily removable for renewal and are reversible, so that unworn portions of the gripping surfaces may be presented for use in lieu of the worn surfaces.

With the above and other objects in view, the invention consists of the novel construction, combination and arrangement of parts, hereinafter fully described and claimed, reference being had to the accompanying drawing, in which:—

Figure 1 is a side elevation of a lathe dog or wrench embodying my invention. Fig. 2 is a reverse side elevation of the same. Fig. 3 is a plan view with the head and jaws in longitudinal section.

Referring to the drawing, 1 designates the shank of the tool provided at its forward end with a head, holding-iron or ring 2, within which are arranged the gripping jaws 3 and 4. The inner wall of the head 2 is of oblong form to provide front and rear surfaces 5 and 6 which are curved on arcs eccentric to the axis of the head, and intervening upper and lower surfaces 7 and 8 which may be curved on arcs concentric with the axis of the head, or have a less degree of eccentric curvature than the surfaces 5 and 6. The pairs or sets of surfaces 5 and 6, 7 and 8 are arranged diametrically opposite each other, the one set in a plane at right angles to the other, as clearly shown. This specific arrangement may, of course, be varied, that is to say, the sets of surfaces may be reversed in relative arrangement on the head, as circumstances may require.

The outer faces of the jaws 3 and 4 are curved on arcs to correspond with the surfaces 5 and 6 and normally bear against the same, while the inner faces of said jaws may curve in a true arc and are preferably each provided with an inner row of V-shaped gripping teeth or serrations 9, although they may be smooth-surfaced or formed with gripping portions of any preferred character to adapt them for engagement with any particular type of object. Each jaw is provided at one side with a retaining flange 10 to bear against one side of the holding-ring or head 2, and extends at its opposite side flush with the opposite side of the head. On said opposite side are provided holding devices 11, which may be in the nature of ordinary screws engaging threaded openings therein, the heads of the screws being arranged to engage the side of the ring opposite the flanges 10 to coöperate with said flanges in holding the jaws against lateral or outward movement. The screws lightly engage the sides of the jaws, so as to permit the latter to slide or turn within the ring for self-gripping adjustment.

In the operation of the device, the object to be gripped and held or turned is arranged to extend through the head between the jaws and the tool turned by means of the shank 1. The gripping surfaces of the jaws are intended primarily to lightly engage the surface of the object, and in turning the tool the jaws ride in unison in the head partially out of engagement with the surfaces 5 and 6 and into engagement with the surfaces 7 and 8, a cam action thereby being induced, whereby the jaws are forced inwardly into gripping engagement with the object. The degree to which the jaws will turn depends upon the resistance of the object, and consequently the greater the resistance, the greater the extent of movement of the jaws, or the degree of independent movement of the head around the jaws, until the latter firmly grip the pipe and a binding action is instituted between the head and the jaws, whereupon the object will be firmly held. A reverse movement of the tool will, of course, relax the jaws, leaving the tool free to be slipped off the object, or the latter to be removed from the head. This action will occur in the movement of the tool in either direction, that is, either backward or forward, until a frictional binding or locking action is effected, when the object may be gripped and held stationary or turned, according to the character of work to be performed. By the provision of V-shaped teeth the points of the teeth will impinge against the object in either direction of movement of the handle, and by the simple form and arrangement of the cam surfaces employed it will be seen that a self-adjusting action of the jaws is secured in an effective manner without employing extraneous elements or increasing the cost of the tool to any material extent.

When the tool has been employed for any material length of time in gripping and turning objects in one direction and the sides of the teeth facing in such direction have become worn, upon removing the screws 11 the jaws may be detached and reversed, so as to present opposite or unworn teeth of the jaws for use, thus increasing the efficiency of the tool. This mode of mounting the jaws in place also permits of their ready removal when worn for the substitution of new jaws therefor.

The principles of the invention may be employed in machinists' lathe dogs, pipe and rod wrenches and other tools. If desired, binding screws 12 may be employed upon the ring to engage the jaws when set to grip an object to hold them fixed against loosening or slipping under any casual retrograde movement of the tool.

Having thus described the invention, what is claimed as new, is—

1. A tool of the character described comprising a shank having a ring-shaped head providing cam surfaces, jaws slidably mounted within the head and provided with retaining flanges to engage one side thereof, and holding devices on the jaws to engage the opposite side of the head, said devices being adapted to permit removal of the jaws through one side of the head.

2. A device of the character described comprising a shank provided with a ring-shaped head forming a receiving chamber having cam walls, jaws slidably engaging said walls, said jaws being provided at one side with retaining flanges engaging one side of the head, and retaining screws on the opposite side of the jaws engaging the reverse side of the head, said screws being removable to permit lateral detachment of the jaws.

In testimony whereof I affix my signature in presence of two witnesses.

ROSS R. PENN.

Witnesses:
I. J. BRION,
ELMER M. EIKENBERG.